(12) United States Patent
Beale et al.

(10) Patent No.: US 9,071,861 B1
(45) Date of Patent: Jun. 30, 2015

(54) VIDEO LOOP APPARATUS AND METHODS FOR USE WITH DIGITAL TELEVISION SYSTEMS

(75) Inventors: Bradley J. Beale, Manhattan Beach, CA (US); Tommi J. Iten, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 3584 days.

(21) Appl. No.: 10/851,838

(22) Filed: May 21, 2004

(51) Int. Cl.
*H04N 21/418* (2011.01)
*H04N 21/434* (2011.01)
*H04N 21/435* (2011.01)

(52) U.S. Cl.
CPC ......... *H04N 21/4181* (2013.01); *H04N 21/418* (2013.01); *H04N 21/434* (2013.01); *H04N 21/4341* (2013.01); *H04N 21/435* (2013.01)

(58) Field of Classification Search
CPC ............ H04N 21/4181; H04N 21/418; H04N 21/434; H04N 21/4341; H04N 21/435
USPC .......................................................... 725/32
See application file for complete search history.

(56) References Cited

U.S. PATENT DOCUMENTS

| | | | |
|---|---|---|---|
| 5,392,066 A | 2/1995 | Fisher et al. | |
| 5,412,404 A | 5/1995 | Candy | |
| 5,761,601 A | 6/1998 | Nemirofsky et al. | |
| 5,854,618 A | 12/1998 | Kiwiet et al. | |
| 6,157,719 A * | 12/2000 | Wasilewski et al. | 380/210 |
| 6,609,146 B1 * | 8/2003 | Slotznick | 709/200 |
| 6,636,220 B1 * | 10/2003 | Szeliski et al. | 345/475 |
| 6,920,606 B1 * | 7/2005 | Jablonski et al. | 715/202 |
| 6,993,508 B1 * | 1/2006 | Major et al. | 705/51 |
| 7,010,801 B1 * | 3/2006 | Jerding et al. | 725/95 |
| 2002/0104082 A1 * | 8/2002 | Fries | 725/32 |
| 2002/0166127 A1 * | 11/2002 | Hamano et al. | 725/105 |
| 2003/0059047 A1 * | 3/2003 | Iwamura | 380/201 |
| 2003/0063090 A1 * | 4/2003 | Kraft et al. | 345/475 |
| 2003/0088872 A1 * | 5/2003 | Maissel et al. | 725/46 |
| 2003/0204575 A1 * | 10/2003 | Master et al. | 709/220 |
| 2004/0089717 A1 * | 5/2004 | Harari et al. | 235/441 |
| 2004/0117831 A1 * | 6/2004 | Ellis et al. | 725/53 |
| 2004/0261096 A1 * | 12/2004 | Matz | 725/28 |
| 2005/0062888 A1 * | 3/2005 | Wood et al. | 348/553 |
| 2005/0097593 A1 * | 5/2005 | Raley et al. | 725/14 |

* cited by examiner

*Primary Examiner* — Robert Hance (57) ABSTRACT

Video loop apparatus and methods for use with digital television systems are disclosed. The methods and apparatus store a media file loop in a receiver and retrieve the media file loop to generate a video loop signal based on the media file loop. The video loop signal is output for display to a television, a video monitor or the like.

3 Claims, 5 Drawing Sheets

VIDEO LOOP APPARATUS AND METHODS FOR USE WITH DIGITAL TELEVISION SYSTEMS

FIELD OF THE DISCLOSURE

The present disclosure relates generally to digital television systems and, more specifically, to video loop apparatus and methods for use with digital television systems.

BACKGROUND

Digital television systems have become increasingly popular due to their ability to efficiently distribute a large number of video and/or audio programs, as well as other data or informational services, over a wide geographic region. Digital television systems such as, for example, the system provided by DIRECTV® may use a satellite-based broadcast or distribution infrastructure. However, other digital television systems may broadcast signals via cable, wireless land-based transmission stations, phone lines, or any combination thereof.

Regardless of the distribution infrastructure employed, digital television systems typically utilize receivers, which are commonly referred to as set-top boxes, that are coupled to a television or video monitor at each subscriber's viewing location (e.g., a home or business location). The receiver or set-top box is responsive to signals received from a hand-held remote device (e.g., a remote control). The subscriber may use the remote device to cause their receiver to selectively parse data packets associated with a particular program, decode those data packets and use the decoded data packets to output the program for consumption (e.g., viewing and/or listening) by the subscriber.

In addition to providing access to a wide variety of video programs (e.g., television programs, advertisements, etc.), audio programs, data services (e.g., program or software downloads), etc, the receiver or set-top box also provides one or more user-interactive features such as, for example, grid-based and/or pictographic program guides that enable subscribers to plan and carry out their viewing activities.

When not viewing a program, many digital television subscribers may leave the receiver in a condition in which a program guide or the like is continuously displayed. Unfortunately, the continuous display of such a program guide is not aesthetically appealing and can lead to burn-in of the television display (i.e., a condition in which the luminescent material of the display is permanently damaged). As a result, many subscribers may prefer to simply turn off their television and/or set-top box.

In an attempt to address the issue of improving the aesthetics and preventing the burn-in of a digital television system that is not currently in active use (i.e., a subscriber is not currently viewing a program), some receiver manufacturers have provided a screen saver feature. These known receiver or set-top box screen savers are similar to the types of screen savers that are commonly used with personal computers. In particular, in response to a period of inactivity, known receiver or set-top box screen savers typically provide simple displays containing line art such as, for example, musical notes, animal tracks, rain drops, etc. using a monochrome pallet. Unfortunately, these known receiver or set-top box screen savers do not provide any significant entertainment value. Furthermore, these known screen savers are typically not user selectable or configurable and typically cannot be broadcast from the headend of the digital television distribution system.

DETAILED DESCRIPTION

While the following disclosure is made with respect to example DIRECTV® broadcast services and systems, it should be understood that many other delivery systems are readily applicable. Such systems include wired or cable distribution systems, UHF/VHF radio frequency systems or other terrestrial broadcast systems (e.g., MMDS, LMDS, etc.), and fiber optic networks.

Figure 1:
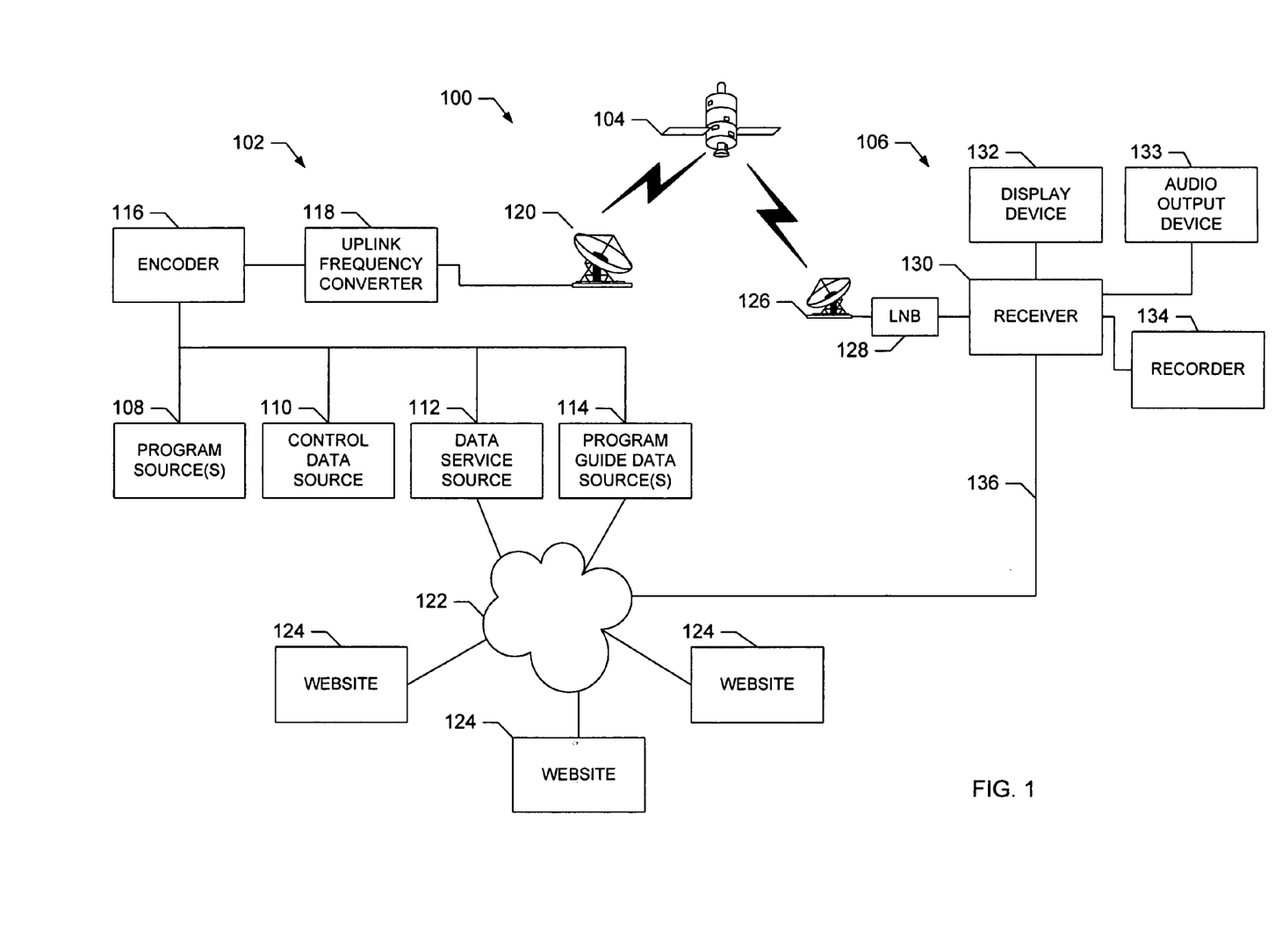
FIG. 1 is a block diagram of an example digital television system.

As shown in FIG. 1, an example digital television system 100 generally includes a headend or transmission station 102, a satellite/relay 104 and a plurality of receiver stations, one of which is shown at reference numeral 106, between which wireless communications are exchanged. The receiver station 106 may be, for example, the residence of a subscriber, a business location, etc. The wireless communications may take place at any suitable frequency, such as, for example, Ku-band frequencies. As described in detail below with respect to each portion of the system 100, information from the transmission station 102 is transmitted to the satellite/relay 104, which may be at least one geosynchronous or geo-stationary satellite that, in turn, rebroadcasts the information over broad geographical areas on the earth that include receiver stations 106. To provide backchannel communications, the receiver stations 106 may be communicatively coupled to the headend or transmission station 102 via a terrestrial communication link, such as a telephone line and/or an Internet connection.

The example transmission station 102 of FIG. 1 includes one or more program sources 108, a control data source 110, a data service source 112, and one or more program guide data sources 114. During operation, information from one or more of the sources 108-114 passes to an encoder 116, which encodes the information for broadcast to the satellite/relay 104. Encoding includes, for example, converting the information into data streams that are multiplexed to form a packetized data stream or bitstream using a number of conventional algorithms. A header is attached to each data packet within the packetized data stream to facilitate identification of the contents of the data packet. The header also includes a service channel identifier (SCID) that identifies the data packet. This data packet is then encrypted. As will be readily appreciated by those having ordinary skill in the art, a SCID is one particular example of a program identifier (PID).

To facilitate the broadcast of information, the encoded information passes from the encoder 116 to an uplink frequency converter 118 that modulates a carrier signal and passes the modulated carrier signal to an uplink antenna 120, which broadcasts the information to the satellite/relay 104. In a conventional manner, the encoded data stream is modulated and sent through the uplink frequency converter 118, which converts the modulated encoded data stream to a frequency band suitable for reception by the satellite/relay 104. The modulated, encoded data stream is then routed from the uplink frequency converter 118 to the uplink antenna 120 where it is broadcast toward the satellite/relay 104.

The programming sources 108 receive video and audio programming from a number of sources, including satellites, terrestrial fiber optics, cable, or tape. The video and audio programming may include, but is not limited to, television programming, movies, sporting events, news, music, web site content, or any other desirable content.

Like the programming sources 108, the control data source 110 passes control data to the encoder 116. Control data may include data representative of a list of SCIDs to be used during the encoding process, or any other suitable information.

The data service source 112 receives data service information and web pages made up of text files, graphics, audio, video, software, etc. Such information may be provided via a network 122. In practice, the network 122 may be the Internet, a local area network (LAN), a wide area network (WAN), a conventional public switched telephone network (PSTN), or any combination thereof. The information received from various sources is compiled by the data service source 112 and provided to the encoder 116. For example, the data service source 112 may request and receive information from one or more websites 124. The information from the websites 124 may be related to the program information provided to the encoder 116 by the program sources 108, thereby providing additional data related to programming content that may be displayed to a user at the receiver station 106.

The program guide data source 114 compiles information related to the SCIDs used by the encoder 116 to encode the data that is broadcast. For example, the program guide data source 114 includes information that the receiver stations 106 use to generate and display a program guide to a user. The program guide may be a grid-based guide, pictographic guide or any other guide that informs the user of particular programs that are available on particular channels at particular times. The program guide also includes information that the receiver stations 106 use to assemble programming for display to the user. For example, if the user desires to watch a baseball game on the receiver station 106, the user may tune to a channel on which the game is offered. As described in detail below, the program guide data source 114 has previously provided a list of SCIDs that correspond to the game to the receiver station 106, thereby enabling the receiver station 106 to gather the data packets having SCIDs that correspond to the desired game.

The satellite/relay 104 receives the modulated, encoded Ku-band data stream and re-broadcasts it downward toward an area on earth that includes the receiver station 106. As shown in FIG. 1, the example receiver station 106 includes a reception antenna 126 connected to a low-noise-block (LNB) 128 that is further connected to a receiver 130. As described in conjunction with FIGS. 2 and 3 below, the receiver 130 may be a set-top box or may be a personal computer (PC) having a receiver card installed therein. A display device 132, such as, for example, a television set or a computer monitor, is coupled to the receiver 130 for displaying received programming to a user. An audio output device 133 such as, for example, one or more speakers, may be coupled to the receiver 130. Of course, the audio output device 133 could be integral with the display device 132. Additionally, the example receiver station 106 may include a recorder 134 for recording programming received by the receiver station 106. The recorder 134 may be, for example, a device capable of recording information on media, such as videotape or digital media such as a hard disk drive, a digital versatile disk (DVD), a compact disk (CD) and/or any other suitable media.

Although not necessary for proper operation of the system 100, the receiver station 106 may optionally incorporate a communication path or link 136 (e.g., Ethernet circuit or modem for communicating over the Internet) to the network 122 for transmitting requests and other data back to the transmission station 102 (or a device managing the transmission station 102 and overall flow of data in the system 100) and for communicating with the websites 124 to obtain information therefrom.

In operation of the receiver station 106, the reception antenna 126 receives signals including a data stream from the satellite 104. The signals are coupled from the reception antenna 126 to the LNB 128, which amplifies and, optionally, downconverts the received signals. The output of the LNB 128 is then provided to the receiver 130, which, as described in detail below, receives, depacketizes, demultiplexes and decodes the received signal to provide audio and video signals to the display device 132, the audio output device 133 and/or the recorder 134. The receiver 130 is responsive to user inputs to tune to a particular program, by selecting and decoding a particular frequency and the particular SCIDs on which the desired program is located.

Figure 2:
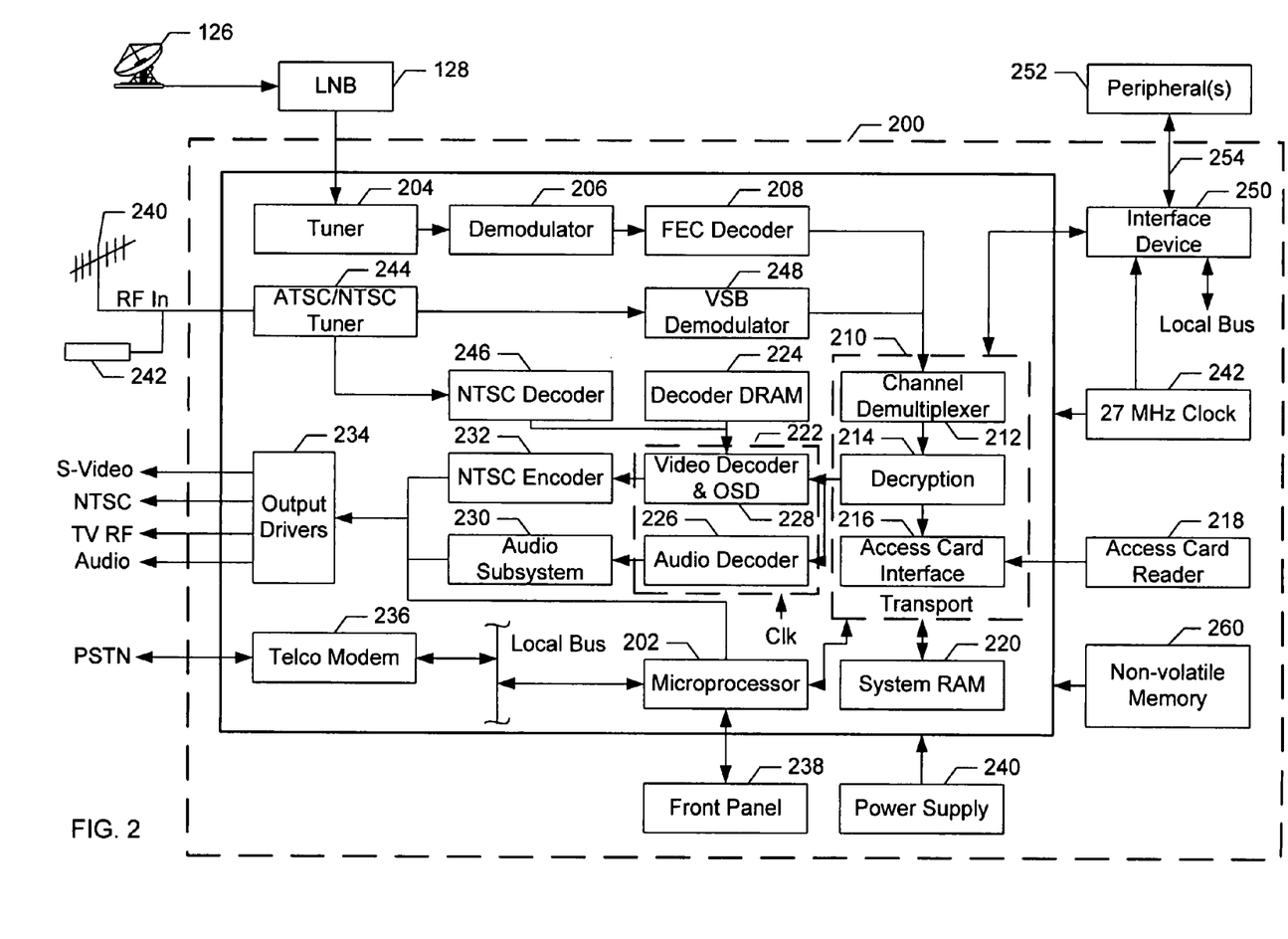
FIG. 2 is a block diagram of an example manner in which the receiver shown in FIG. 1 may be implemented.

FIG. 2 is a block diagram of an example manner in which the receiver 130 shown in FIG. 1 may be implemented. In general, front-end circuitry of the example receiver 200 receives the L-band RF signals from the LNB 128 and converts the signals into the originally transmitted digital data stream. Decoding circuitry receives the original data stream and performs video/audio processing operations such as demultiplexing and decompression. A microprocessor or central processing unit (CPU) 202 controls the overall operation of the receiver unit 200, including the selection of parameters, the set-up and control of components, channel selection, and many other functions.

Specifically, the receiver 200 includes a tuner 204, a demodulator 206, a forward error correction (FEC) decoder 208, a transport circuit 210, a channel demultiplexer 212, a decryption circuit 214, an access card interface 216, an access card reader 218, a memory device 220, an audio/video decoder circuit 222 having an audio decoder 226 and a video decoder 228, a random access memory (RAM) 224, an audio subsystem 230, an NTSC (or other) encoder 232, output drivers 234, a modem connection 236, a front panel user interface 238, and a power supply 240, coupled together as illustrated. As further shown in FIG. 2, a 27 megahertz (MHz) clock signal generator 242 is also provided. The clock generator 242 generates a clock signal (CK) that is coupled to the audio/video decoder circuit 222 and that is frequency-calibrated by a signal received from the transport circuit 210, as shown.

The transport circuit 210 receives the data stream of digitized data packets containing video, audio, data, scheduling information, and other data. The digital packet information contains identifying headers as part of its overhead data. Under control of the microprocessor 202, the channel demultiplexer 212 filters out packets that are not currently of interest, and routes data packets that are of interest through the decryption circuit 214 and, in the case of some packets, also through the access control circuit 216 to their proper downstream destination. The decryption circuit 214 provides decryption for the data packets that have been encrypted. The access control circuit 216 may provide access control by any conventional means. For example, access control may be achieved by requiring a data packet to have a proper authorization code in order to be passed to the decryptor 214 and/or the video decoder 228. The access card reader 218 can interface with an access card (not shown) that receives the packet authorization code, determines its validity, and generates a code that confirms to the transport 210 that the subject data packet is authorized.

The authorized data of interest, which now consists of the payload portions of the received data packets, are forwarded to the random access memory 224 for buffering and may optionally be intermediately stored in the memory device 220. The audio/video decoder 222 decodes the payloads stored in the memory 224, as needed. The requested data is routed from the memory device 220 through the transport 210 to the audio/video decoder 222. At that time, the data is routed to the video decoder 228 (which includes display generating circuitry) and the NTSC (or other) encoder 232. The video decoder 228 reads in the compressed video data from the memory 224, parses it, creates quantized frequency domain coefficients, then performs an inverse quantization, inverse discrete cosine transform (DCT) and motion compensation. At this point, an image is reconstructed in the spatial domain. This image is then stored in a frame buffer in the memory 224. At a later time, the image is read out of the frame buffer in memory 224 and passed through the display circuitry to the encoder 232. The display circuitry (located in the video decoder 228) generates graphics that allow an electronic program guide to be displayed. The encoder 232 may convert the digital video signals to, for example, an analog signal according to the NTSC standard or to another desired output protocol (e.g., ATSC), thereby allowing video to be received by the display device 132.

As shown in FIG. 2, an antenna 240 and/or a cable line 242 may be coupled to the receiver 200 to provide information content from cable or terrestrial broadcast systems (not shown). The signals from the antenna 240 and/or the cable line 242 are coupled to both the output drivers 234 and an ATSC/NTSC tuner 244. The output of the tuner 244 is coupled to an NTSC decoder 246 and to a vestigial side band (VSB) demodulator 248. The output from the decoder 246 is coupled to the decoder 222 and the output of the demodulator 248 is coupled to the transport 210. Additionally, the receiver 200 may include an interface device 250 that receives the clock signal and that is coupled to the local bus of the microprocessor 202. The interface device 250 may be used to provide connectivity to one or more peripherals 252 via a bus 254.

The receiver 200 may also include a non-volatile memory 260. The non-volatile memory 260 may be, for example, mass memory device such as an optical or magnetic media disk drive, a flash memory, or any other non-volatile memory device or system. The receiver 200 may store program guide information, system configuration information, or any other desired information in the non-volatile memory 260, thereby maintaining that information following a reset, a power failure and/or a power cycling of the receiver 200. As discussed in greater detail in connection with FIG. 4 below, the receiver 200 may also store machine executable instructions (e.g., software) and/or data in the non-volatile memory 260 that, when executed by the processor 202, may be used to implement the video loop apparatus and methods described herein.

Figure 3:
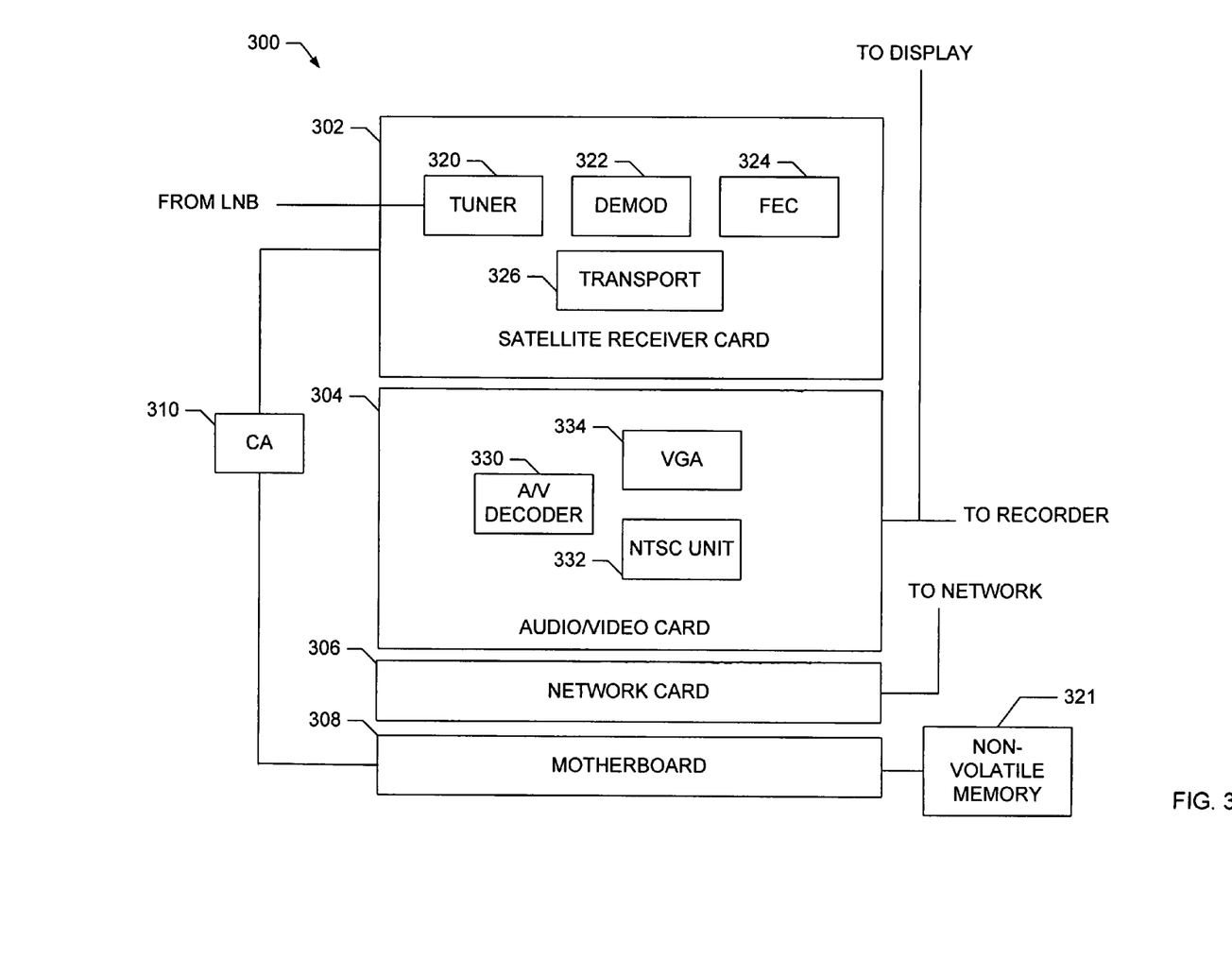
FIG. 3 is a block diagram of another example manner in which the receiver shown in FIG. 1 may be implemented.

FIG. 3 is a block diagram of another example manner in which the receiver 130 shown in FIG. 1 may be implemented. The example receiver 300 shown in FIG. 3 is based on a personal computer architecture. As shown, the receiver 300, which receives an input from the LNB 128, includes a satellite receiver card 302, an audio/video decoder card 304 and a network card 306, each of which may be coupled to a motherboard 308. The video/audio decoder card 304 could, of course, be integrated with the satellite receiver card 302. The receiver station 300 also includes a conditional access module 310 and a non-volatile memory 321. The non-volatile memory 321 may be, for example, a mass memory device such as an optical or magnetic media disk drive, a flash memory, or any other non-volatile memory device or system. The non-volatile memory 321 functions in a manner that is similar or identical to the non-volatile memory 260 shown in FIG. 2.

In one example, the satellite receiver card 302 includes a tuner 320, a demodulator 322, a forward error correction (FEC) decoder 324 and a transport functional processing block 326. The interconnection of these devices is substantially the same as those and described in conjunction with FIG. 2.

The audio/video decoder card 304 includes an audio/video decoder 330, an optional NTSC and/or ATSC output driver 332 and a VGA output driver 334. As described below in detail, the satellite receiver card 302 and the audio/video card 304 receive and decode the signal received from the LNB 126.

In operation, an incoming signal from the LNB 128 is received by the satellite receiver card 302 and passed through a series of initial processing operations including the tuner 320, the demodulator 322 and the forward error correction decoder 324, before passing to the transport functional processing block 326. Although the functional circuits within the transport functional processing block 326 are not illustrated, they are identical to the channel demultiplexing, decryption, and access determination circuit blocks of a standard transport decoder, as described in conjunction with FIG. 2. For example, the transport functional processing block 326 receives the transport stream or data stream of digitized data packets containing video, audio, scheduling information, and other data. The digital packet information contains identifying headers. Under control of a main processor/controller (typically located on the motherboard 308), the transport functional processing block 326 filters out received data packets that are not currently of interest. Received data packets that are of interest are routed through decryption and access control operations within the conditional access module 310. Access control may be provided by any known means, such as, for example, by requiring a data packet to have a proper authorization code in order to be passed to the audio/video decoder card 304.

The transport functional processing block 326 passes the data to the audio/video decoder 330 of the video/audio decoder card 304. The authorized data of interest are stored in system random access memory (RAM) (not shown) for buffering, and the video/audio decoder 330 retrieves the data from RAM as needed.

For video data, the audio/video decoder 330 reads in the compressed video data from its RAM, parses it, creates quantized frequency domain coefficients, then performs an inverse quantization, inverse discrete cosine transform (DCT) and motion compensation. At this point, an image has been reconstructed in the spatial domain. This image is then stored in a frame buffer in the video decoder's RAM. At a later time, the image is read out of the frame buffer and passed through the display circuitry to the VGA output driver 334 and optionally, to the NTSC and/or ATSC output driver 332, the output of which is coupled to the display device 132 and/or the recorder 134. The display circuitry also generates graphics and text for a graphical user interface (GUI), such as an electronic program guide, to be displayed.

The allocation of memory and control functions may be arbitrarily divided between the cards 302-308 of the system 300. Thus, a substantial amount, or possibly all, of the control and memory functions for operation of the disclosed system may be integrated within a single card or, alternatively, may be incorporated within the motherboard 308.

Figure 4:
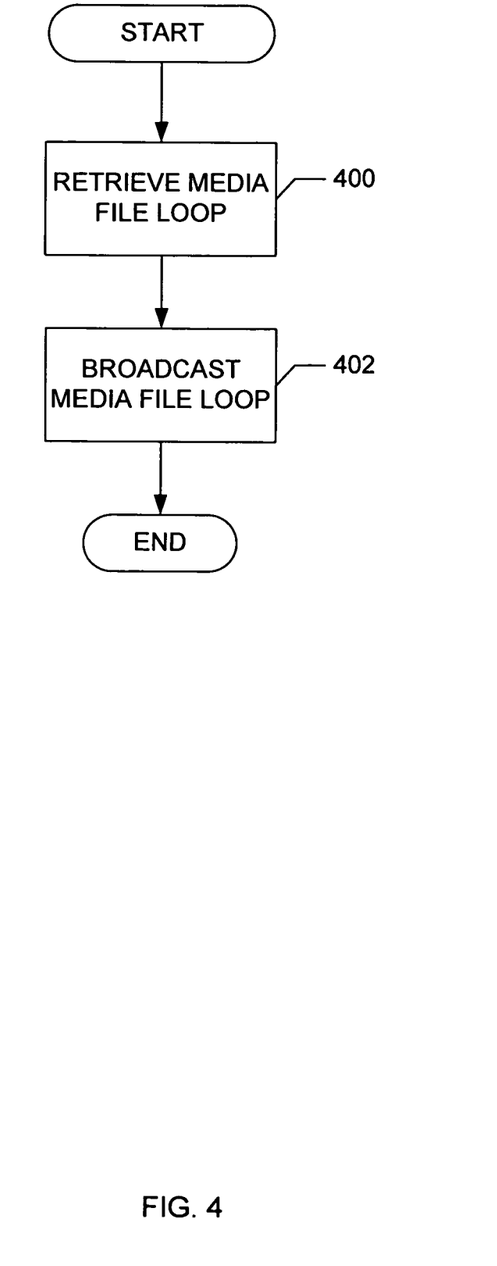
FIG. 4 is a flow diagram of an example manner in which the transmission station of FIG. 1 may be configured to broadcast a media file loop.

FIG. 4 is a flow diagram of an example manner in which the transmission station of FIG. 1 may be configured to broadcast a media file loop. In particular, the headend or transmission station 102 retrieves a signal including a media file loop that contains video and/or audio information related to a video clip that may be presented continuously by the receiver 130 via the display device 132 (block 400). The media file loop may be stored in and retrieved from one of the sources 108-114.

The retrieved media file loop may be implemented using a well-known linear file structure. Specifically, the broadcast media file may be implemented using a Motion Picture Expert Group (MPEG) format, flash, shockwave, executable Java, etc. that is configured to loop for continuous presentation. The media file loop is frame synchronous and, thus, may be implemented to facilitate subsequent storage and processing of the media file loop on a frame by frame basis. For example, the data within the media file loop may be organized in blocks or frames (each of which may be composed of a plurality of data packets) so that each block or frame corresponds to one displayed video frame. In addition, the blocks or frames may be linked to one another to facilitate sequential playback of the video frames. For instance a block or frame may contain information relating to the storage location of a subsequent block or frame (e.g., location pointer, frame identifier, etc.), thereby enabling rapid location, access and display of successive frames or blocks.

The video and audio content within the media file loop broadcast by the transmission station 102 may provide information such as that provided by advertisements for products and/or services (e.g., other tiers of subscriber packages), may provide visually entertaining material such as, for example, environmental scenes, a fireplace, a fish tank, artwork, sports scenes, movie trailers, etc. Of course, the media file loop could include a combination of content types if desired. For example, advertisements or other such informational content may be provided as a leading or trailing part of an entertaining or visually appealing scene or video clip.

After the transmission station 102 has retrieved the media file loop (block 400), the transmission station 102 may broadcast the media file loop using conventional techniques as described in connection with FIG. 1 above (block 402). More specifically, the transmission station 102 converts the media file loop into a plurality of data packets and transmits those packets in a manner similar or identical to the manner in which video and/or audio program information is packetized and transmitted.

Figure 5:
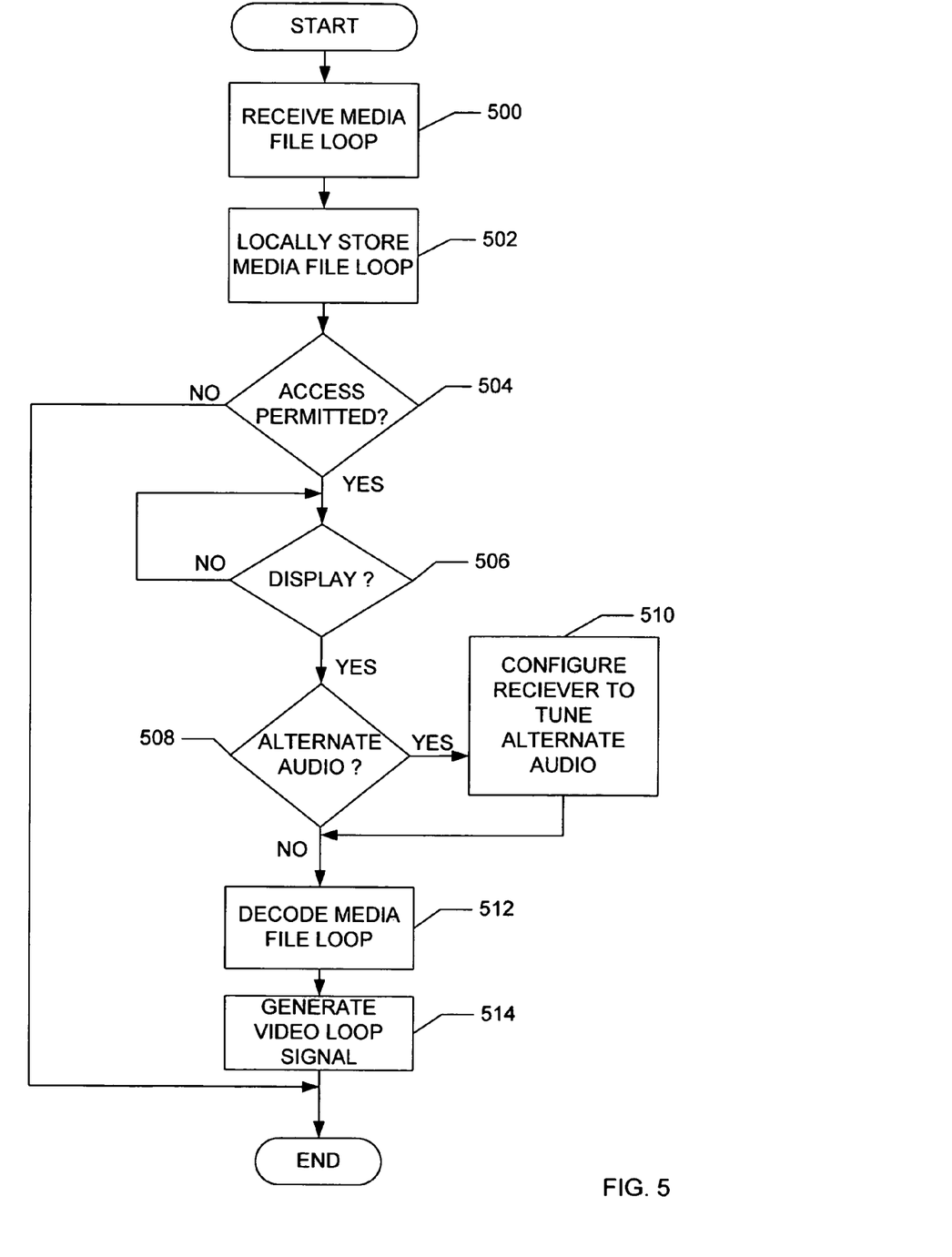
FIG. 5 is a flow diagram of an example manner in which the receiver shown in FIG. 1 may be configured to provide the video loop apparatus and methods described herein.

FIG. 5 is a flow diagram of an example manner in which the receiver 130 shown in FIG. 1 may be configured to provide the video loop apparatus and methods described herein. The receiving station 106 (FIG. 1) receives the broadcast media file loop via the reception antenna 126, the LNB 128 and the receiver 130 (block 500). As part of the reception process, the receiver 130 passes the data packets making up the media file loop through its transport mechanism (e.g., the transport circuit 210 of FIG. 2) and then locally stores the media file loop in, for example, a mass storage device such as the non-volatile memory 260 shown and described in connection with the example receiver 200 of FIG. 2 (block 502).

The receiver 130 (FIG. 1) may be configured to locally store the media file loop regardless of whether the receiver 130 has been authorized to utilize the media file loop. Such authorization may, for example, be granted to the receiver 130 if a subscriber associated with the receiver 130 has paid for use of the media file loop (e.g., on a pay per view basis, a subscription basis, etc.), for a period of time regardless of whether the subscriber has paid for the use of the media file loop (i.e., a free use period), for an indefinite period of time regardless of whether the subscriber has paid for its use (i.e., free use), or in any other desired manner. In any case, the receiver 130 may use a conditional access system (e.g., the conditional access unit 216 shown in the example receiver 200 of FIG. 2) to determine if access to the locally stored media file loop is permitted (block 504). If access is not permitted, the receiver 130 does not process the media file loop for consumption at the reception site 106. On the other hand, if access is granted or permitted, the receiver 130 may determine if the video loop should be displayed (block 506). The determination to display the video loop (block 506) may be based on a timeout or the elapse of a period of inactivity and/or may be based on a user directive or command to display the video loop. In addition, the receiver may determine if the subscriber desires to output alternate audio (i.e., an audio program other than the audio information provided in the media file loop) (block 508). For example, the receiver 130 may output a graphical user interface that prompts a user for a selection of which, if any, alternate audio program is to be output in conjunction with the play or execution of the video loop. The user may be offered a selection of alternate audio sources including a music service channel, a video/audio broadcast channel (only the audio portion would be used in conjunction with the video file loop), an audio only channel, etc. If an alternate audio source is selected, the receiver 130 may be configured to tune to that alternate audio source or channel (block 510) in conjunction with the play or execution of the video loop.

The receiver 130 then decodes the media file loop (which is stored in an encrypted format) (block 512) and generates, for example, NTSC compatible signals from the media file loop (block 514) that are output to the display device 132.

While the methods described in connection with FIGS. 4 and 5 above broadcast the media file loop from a transmission station (e.g., the station 102), the media file loop could instead be stored in the receiver 130 at the time of its manufacture or at least prior to installation of the receiver 130 at a subscriber's location. In that case, the subscriber may be permitted to use the pre-loaded or stored media file loop without charge or, alternatively, may have to pay a fee for each use or for a period use of the media file loop. Alternatively, the media file loop could be stored on a portable memory device that can be interfaced to with the receiver 130 such as, for example, a conditional access card or the like. In that case, the media file loop could be downloaded into the receiver upon coupling (e.g., insertion) of the portable memory device to the receiver 130. Still further, the media file loop could be provided to the receiver 130 via a network connection (e.g., the link 136) or the like.

While the video loop apparatus and methods described herein are described as using one media file loop, multiple file loops could be made available. In that case, a subscriber may be offered a selection from which one may be selected for display.

Although certain methods, apparatus and articles of manufacture have been described herein, the scope of coverage of this patent is not limited thereto. To the contrary, this patent covers all embodiments fairly falling within the scope of the appended claims either literally or under the doctrine of equivalents.

What is claimed is:

1. A method of generating a video loop signal, comprising:
receiving a media file loop having moving images via a broadcast data stream in a receiver having a removable conditional access card for authorizing access to the broadcast data stream;
storing the received media file loop;
determining if use of the stored media file loop is permitted using the conditional access card; and
if use of the stored media file loop is permitted, generating the video loop signal based on the media file loop in the receiver;
wherein the method further comprises configuring a receiver to output audio information that is not contained within the media file loop, comprising the step of tuning to a source of the output audio information, wherein the source of the output audio information is accessed via a channel comprising a video portion and an audio portion, and only the audio portion is presented in conjunction with the media file loop.

2. An apparatus for outputting a displayable video loop having moving images, comprising:
a transport unit that processes a broadcast data stream;
a removable conditional access card, the conditional access card for authorizing access to the broadcast data stream and for storing a media loop file; and
a processor coupled to the conditional access card and programmed to retrieve the media file loop from the conditional access card and to output a video display signal containing the displayable video loop;
wherein the processor is programmed to determine if use of the stored media file loop is permitted prior to outputting the video display signal, and wherein the processor is programmed to tune to an alternate audio source to output audio information that is not contained within the media file loop, and wherein the alternate audio source is accessed via a channel comprising a video and an audio portion, and only the audio portion is presented in conjunction with the media file loop.

3. A non-transitory computer-readable medium having instructions stored thereon that, when executed, cause the computer to
receive a media file loop having moving images via a broadcast data stream in a receiver having a removable conditional access card for authorizing access to the broadcast data stream; store the received media file loop;
determine if use of the stored media file loop is permitted using the conditional access card; and
if use of the stored media file loop is permitted, generate a video loop signal based on the media file loop;
wherein the instructions further comprise instructions stored thereon that, when executed, cause the computer to tune to a source of output audio information that is not contained within the media file loop, wherein source of the output audio information is accessed via a channel comprising a video portion and an audio portion, and only the audio portion is presented in conjunction with the media file loop.

* * * * *